United States Patent
Liang

(10) Patent No.: US 9,798,827 B2
(45) Date of Patent: Oct. 24, 2017

(54) METHODS AND DEVICES FOR PRELOADING WEBPAGES

(71) Applicant: UC Mobile Co., Ltd., Beijing (CN)

(72) Inventor: Jie Liang, Beijing (CN)

(73) Assignee: UC MOBILE CO., LTD., Beijing (CN)

( * ) Notice: Subject to any disclaimer, the term of this patent is extended or adjusted under 35 U.S.C. 154(b) by 0 days.

(21) Appl. No.: 15/032,023

(22) PCT Filed: Jun. 26, 2014

(86) PCT No.: PCT/CN2014/080890
§ 371 (c)(1),
(2) Date: Apr. 25, 2016

(87) PCT Pub. No.: WO2015/058546
PCT Pub. Date: Apr. 30, 2015

(65) Prior Publication Data
US 2016/0306894 A1    Oct. 20, 2016

(30) Foreign Application Priority Data

Oct. 25, 2013    (CN) .......................... 2013 1 0510120
Dec. 30, 2013    (CN) .......................... 2013 1 0743798

(51) Int. Cl.
*G06F 17/00*    (2006.01)
*G06F 17/30*    (2006.01)
(Continued)

(52) U.S. Cl.
CPC .... *G06F 17/30902* (2013.01); *G06F 17/2205* (2013.01); *G06F 17/2247* (2013.01);
(Continued)

(58) Field of Classification Search
CPC ............................................... G06F 17/30902
See application file for complete search history.

(56) References Cited

U.S. PATENT DOCUMENTS 6,622,168 B1 *    9/2003    Datta ................ G06F 17/30902
707/E17.12
8,868,637 B2 *    10/2014    Rosenstein ....... G06F 17/30899
709/202
(Continued)

FOREIGN PATENT DOCUMENTS

CN    101464805    6/2009
CN    102109981    6/2011
(Continued)

OTHER PUBLICATIONS

International Written Opinion for PCT/CN2014/080890, dated Sep. 24, 2014, 8 pages.
(Continued)

*Primary Examiner* — Laurie Ries

(57) ABSTRACT

Embodiments of the present disclosure disclose a method and a device for webpage preloading. The method includes: conducting webpage preloading according to a current preloading policy, in which the preloading policy includes: a preloading time range, a preloading region, a preloading page depth, and an available caching space for preloading; counting historical data within a pre-set time period, in which the historical data includes: information about an accessed webpage, information about a preloaded webpage, and state information of a local cache; and updating the preloading policy based on the historical data. In the present disclosure, by way of counting the preloading historical data within a pre-set time period, and based on the changes in the historical data, the preloading policy is automatically updated, so that the preloading policy can adapt to network and user access conditions in real time, thereby improving the hit accuracy of webpage preloading.

23 Claims, 9 Drawing Sheets

(51) Int. Cl.
*G06F 17/22* (2006.01)
*G06F 17/27* (2006.01)
*H04L 29/08* (2006.01)

(52) U.S. Cl.
CPC .......... *G06F 17/2705* (2013.01); *H04L 67/02* (2013.01); *H04L 67/2847* (2013.01)

(56) References Cited

U.S. PATENT DOCUMENTS

| | | | | |
|---|---|---|---|---|
| 9,065,793 | B2* | 6/2015 | Gleadall | G06F 17/30902 |
| 9,401,949 | B1* | 7/2016 | Kolam | H04L 67/1095 |
| 9,449,113 | B2* | 9/2016 | Hilerio | G06F 12/0866 |
| 9,509,764 | B1* | 11/2016 | Kolam | H04L 67/02 |
| 9,582,603 | B1* | 2/2017 | Acharya | G06F 17/30902 |
| 2002/0147788 | A1* | 10/2002 | Nguyen | G06F 17/30902 709/217 |
| 2004/0177385 | A1* | 9/2004 | Yoo | G11B 27/105 725/142 |
| 2005/0240652 | A1* | 10/2005 | Crick | G06F 17/30902 709/203 |
| 2007/0050603 | A1* | 3/2007 | Vorbach | G06F 9/30181 712/221 |
| 2008/0208985 | A1* | 8/2008 | Georgis | H04N 7/17309 709/206 |
| 2013/0031459 | A1* | 1/2013 | Khorashadi | G06F 17/30905 715/234 |
| 2014/0040979 | A1* | 2/2014 | Barton | H04L 63/20 726/1 |
| 2014/0280677 | A1* | 9/2014 | Altman | H04L 67/2847 709/213 |
| 2014/0379841 | A1* | 12/2014 | Zong | G06F 17/30902 709/213 |
| 2015/0154313 | A1* | 6/2015 | Zong | G06F 17/30902 707/736 |
| 2015/0186545 | A1* | 7/2015 | Krutzler | G06F 17/30902 715/234 |
| 2015/0193395 | A1* | 7/2015 | Nicolaou | G06F 17/30902 707/726 |
| 2015/0200994 | A1* | 7/2015 | Jain | H04L 67/02 709/219 |
| 2015/0242756 | A1* | 8/2015 | Chittimalla | H04L 67/2847 706/52 |
| 2016/0205209 | A1* | 7/2016 | Kapadia | H04L 67/02 709/213 |
| 2017/0013072 | A1* | 1/2017 | Liang | H04L 67/22 |
| 2017/0099340 | A1* | 4/2017 | Li | H04L 67/02 |

FOREIGN PATENT DOCUMENTS

| | | |
|---|---|---|
| CN | 102253840 | 11/2011 |
| CN | 102446222 | 5/2012 |
| CN | 102591963 A | 7/2012 |
| CN | 102663012 A | 9/2012 |
| CN | 102682014 | 9/2012 |
| CN | 102855318 | 1/2013 |
| CN | 102883324 | 1/2013 |
| CN | 103309700 | 9/2013 |
| CN | 103369508 A | 10/2013 |
| CN | 103729438 A | 4/2014 |

OTHER PUBLICATIONS

International Search Report for PCT/CN2014/080890, dated Sep. 24, 2014, 4 pages.
International Written Opinion for PCT/CN2014/080890, dated Sep. 24, 2014, 7 pages.
International Preliminary Report on Patentability for PCT/CN2014/080890, dated Apr. 26, 2016, 8 pages.
First Notice issued by China State Intellectual Property Office, dated Mar. 28, 2016 for Chinese Patent Application No. 201310510120.1 with search report.
First Notice issued by China State Intellectual Property Office, dated May 5, 2016 for Chinese Patent Application No. 201310743798.4 with search report.
Second Notice issued by China State Intellectual Property Office, dated Aug. 17, 2016 for Chinese Patent Application No. 201310510120.1.
Second Notice issued by China State Intellectual Property Office, dated Dec. 30, 2016 for Chinese Patent Application No. 201310743798.4.
Third Notice issued by China State Intellectual Property Office, dated Jan. 10, 2017 for Chinese Patent Application No. 201310510120.1.

* cited by examiner

METHODS AND DEVICES FOR PRELOADING WEBPAGES

CROSS-REFERENCE TO RELATED APPLICATIONS

This application is a national stage application of International Application No. PCT/CN2014/080890, filed on Jun. 26, 2014, which claims priority to and benefits of Chinese Patent Application No. 201310510120.1, filed on Oct. 25, 2013, and Chinese Patent Application No. 201310743798.4, filed on Dec. 30, 2013. The contents of the above-referenced applications are incorporated herein by reference in their entirety.

TECHNICAL FIELD

The present disclosure relates to the field of Internet technologies, and more particularly to methods and devices for preloading one or more webpages.

BACKGROUND

When a user browses a webpage, in order to reduce the time spent on loading a webpage or data of the webpage, generally, a browser will preload the webpage or data of the webpage (webpage preloading). That is, after loading a current page, the browser predicts a target webpage that the user may access next, during the time interval spent by the user on browsing the current page, downloads the data of the target webpage, and saves the data in a local cache. Once the user clicks a link of this target webpage, the browser directly extracts the data of the target webpage from the cache and presents the data to the user quickly.

Generally, webpage preloading methods identify a part of target webpages that need to be preloaded, according to some fixed policies and rules, for example, by way of counting recently popular webpages containing hot topics, webpages containing some keywords, and so on. These methods mainly inform a computing system to preload which webpages to select as target webpages based on counting results. Then, the computing system saves these webpages in a local cache or cache memory, waiting for to be read when the user accesses the webpages next time.

The inventor finds that, in these webpage preloading methods, the rules for predicting the target webpages to preload are relatively fixed. A change in the counting results requires setting a new rule manually, which lacks flexibility. Moreover, due to the lagging feature of the preloading rules, it may easily results in lower "hit" accuracy in webpage preloading.

In addition, the development of Android applications for mobile terminals usually encounters a practical contradiction between subsequent expanding and enforcing functions of an application program and changing application program codes, which is a flexibility problem of the application programs. To eliminate such contradiction, methods for expanding programs in a traditional software, e.g., an application, can be used, such as implementing a plug-in (e.g., a plug-in module or a plug-in software). When an existing application needs to interact or communicate with a plug-in, the application needs to be integrated with a plug-in system.

Currently, in existing mobile terminals, a plug-in system for an application is developed as a part of the application. The plug-in system exists relying on the application. In an architecture of the existing plug-in systems, the application and the plug-in system heavily reply on each other, and are even inseparable from each other. Functions of the plug-in system include plug-in loading, plug-in unloading, plug-in management, plug-in calling, plug-in interface, and so on, all of which rely on the application. Regardless of whether the plug-in calls the application or the application calls the plug-in, the plug-in system must be used, and the application and the plug-in system are tightly coupled.

Therefore, in the existing plug-in systems, various parts are extremely highly dependent upon each other, and the change of one part may cause changes of most other parts, which results in an extremely large volume of work in development and design of the plug-in system, poor flexibility of the plug-in system, and low stability of the plug-in system because changes need to be made frequently.

SUMMARY

The embodiments of the present disclosure provide methods and devices for webpage preloading, to solve the above problems and other technical problems in the prior art, that is, due to the relatively fixed rules for predicting the preloaded pages, once a counting result changes, new rules need to be set manually, which lacks flexibility, and the lagging feature of the preloading rules may easily results in lower "hit" accuracy in webpage preloading.

To solve the above technical problems, the embodiments of the present disclosure disclose the following technical solutions:

In an aspect, the present disclosure provides a method for webpage preloading. The method includes:
  conducting webpage preloading according to a current preloading policy, in which the preloading policy includes: a preloading time range, a preloading region, a preloading page depth, and an available caching space for preloading;
  counting historical data within a pre-set time period, in which the historical data includes: information about an accessed webpage, information about a preloaded webpage, and state information of a local cache; and
  updating the preloading policy based on the historical data.

In another aspect, the present disclosure provides a device for webpage preloading. The device includes a storage device and one or more processors. The device further includes:
  a pre-loading unit, stored in a storage device and executed by the one or more processors to conduct webpage preloading according to a current preloading policy, in which the preloading policy includes: a preloading time range, a preloading region, a preloading page depth, and an available caching space for preloading;
  a counting unit, stored in the storage device and executed by the one or more processors to count historical data within a pre-set time period, in which the historical data includes: information about an accessed webpage, information about a preloaded webpage, and state information of a local cache; and
  an updating unit, stored in the storage device and executed by the one or more processors to update the preloading policy based on the historical data counted by the counting unit.

In still another aspect, the present disclosure further discloses a method for webpage preloading, which includes the following steps:
  acquiring historical data containing one or more of types of information, including information about an accessed webpage, information about a preloaded webpage, and state information of a local cache;

counting the historical data within a pre-set time period and updating a pre-reading policy; and conducting webpage preloading according to the pre-reading policy.

In still another aspect, the present disclosure further discloses a system for webpage preloading. The system includes a storage device;

one or more processors;

a data acquiring unit, stored in the storage device and executed by the one or more processors to acquire historical data including one or more of types of information, including information about an accessed webpage, information about a preloaded webpage, and state information of a local cache;

an updating unit, stored in the storage device and executed by the one or more processors, to count the historical data within a pre-set time period and to update a pre-reading policy; and a pre-loading unit, for being stored in the storage device, and being executed by the one or more processors, to conduct webpage preloading according to the pre-reading policy.

In addition, the present disclosure further discloses a computer-readable storage medium, stored with computer-executable instructions, in which when a processor executes the computer-executable instructions, the processor performs the following steps:

acquiring historical data including one or more of types of information, including information about an accessed webpage, information about a preloaded webpage, and state information of a local cache;

counting the historical data within a pre-set time period and updating a pre-reading policy based on the historical data; and conducting webpage preloading according to the pre-reading policy.

In still another aspect, the present disclosure further discloses a plug-in system for mobile terminals. The plug-in system includes an engine module and an adaption module.

The engine module, independent from an application, provides core functions associated with a plug-in and interacts with the adaption module when loading a plug-in.

The adaption module provides different functions of an application, in the form of an interface, for being used by a plug-in. When receiving an application calling message for calling an application sent by the plug-in through the interface, the adaption module transfers the application calling message to the application to be processed by the application. When receiving a plug-in calling message sent by the application, the adaption module transfers the plug-in calling message to the plug-in through the interface to be processed by the plug-in.

In some embodiments, the engine module includes: a plug-in management module, a plug-in loading module, an adaption connecting module, a first application connecting module, and a plug-in channel setup module.

The plug-in management module, after receiving plug-in configuration information and a plug-in mirror generating message, generates a plug-in mirror based on the plug-in configuration information, receives plug-in loading request information transferred from the adaption connecting module, sends the plug-in loading request information to the plug-in loading module, and receives plug-in loading complete information sent by the plug-in loading module.

The plug-in loading module receives plug-in loading request information sent by the plug-in management module, loads the plug-in according to the plug-in loading request information, and sends plug-in loading complete information to the plug-in management module. When the adaption module receives the plug-in calling message sent by an application, the adaption module queries whether the plug-in is loaded. If the plug-in is not loaded yet, the adaption module sends the plug-in loading request information to the adaption connecting module, which then transfers the plug-in loading request information to the plug-in management module.

The adaption connecting module transmits interaction information between the engine module and the adaption module.

The first application connecting module transmits interaction information between the engine module and an application.

The plug-in channel setup module sets up a plug-in communication channel between a plug-in and an application.

In some embodiments, the engine module further includes one or more of the following modules:

a plug-in detection module that detects a new plug-in, acquires the plug-in configuration information, and sends the plug-in configuration information and the plug-in mirror generating message to the plug-in management module; and a plug-in storage module that stores the plug-in mirror generated by the plug-in management module.

In some embodiments, the engine module further includes one or more of the following modules:

a plug-in legality management module that determines legality of a plug-in based on plug-in legality determination information sent by the plug-in management module, and sends a legality determination result to the plug-in management module; and a plug-in authority management module that verifies authority of a plug-in based on plug-in authority verification information sent by the plug-in management module, and if the plug-in passes the verification, generates a plug-in authority list, and sends a verification result to the plug-in management module.

In some embodiments, the adaption module further includes:

a second application connecting module, an engine connecting module, and a plug-in connecting module.

The second application connecting module, after receiving application calling information for calling an application sent by the plug-in connecting module, sends the application calling information to the application, and after receiving a plug-in calling message for calling a plug-in by an application, generates a determination request for determining whether the current plug-in is loaded or not, sends the determination request to the engine connecting module. If the plug-in is loaded, the second application connecting module 400 sends the plug-in calling message to the plug-in. If the plug-in is not loaded, the second application connecting module 400 waits for the plug-in to be loaded, and after the plug-in is loaded, sends the plug-in calling message to the plug-in.

The engine connecting module transmits interaction information between the engine module and the adaption module, and determines whether a current plug-in is loaded or not. If the current plug-in is not loaded, engine connecting module sends a plug-in loading request to the adaption connecting module of the engine module.

The plug-in connecting module receives the plug-in calling message sent by the second application connecting module, and sends the plug-in calling message to the plug-in, and/or receives an application calling message sent by the plug-in, and sends the application calling message to the second application connecting module.

In some embodiments, the adaption module further includes:

a plug-in SDK module, set between the plug-in connecting module and the plug-in, that receives the application calling message for calling an application by the plug-in, and sends the application calling message to the second application connecting module, and/or receives the plug-in calling message for calling a plug-in by an application sent by the plug-in connecting module, and sends the plug-in calling message to the plug-in to be processed by the plug-in.

In addition, the present disclosure further provides a method for managing a plug-in. The method includes:

setting an adaption module and an engine module, independent from an application, in a plug-in system;

transmitting a plug-in calling message for calling a plug-in by an application sequentially through the engine module and the adaption module, for calling the plug-in; and transmitting an application calling message for calling an application by a plug-in through the adaption module, for calling the application.

In some embodiments, the method for managing a plug-in further includes:

when the engine module detects a new plug-in, acquiring plug-in configuration information of the plug-in, generating a plug-in mirror based on the plug-in configuration information, and storing the plug-in mirror.

In some embodiments, the method for managing a plug-in further includes:

when the adaption module receives a message for calling a plug-in by an application, determining whether a currently called plug-in is loaded or not; if the currently called plug-in is not loaded, using the adaption module to inform or request the engine module to load the plug-in; after receiving a plug-in loading request by the engine module, resolving a plug-in mirror of the currently called plug-in, acquiring plug-in configuration information of the currently called plug-in, and locating the currently called plug-in based on the plug-in configuration information, and loading the currently called plug-in by the engine module.

In some embodiments, the method for managing a plug-in further includes:

performing legality determination on a plug-in by the engine module, and if the plug-in is determined to be legal, loading the plug-in.

In some embodiments, the method for managing a plug-in further includes:

performing authority verification on a plug-in by the engine module, and if the plug-in passes the verification, generating a plug-in authority list, and sending the plug-in authority list to the plug-in management module.

When the adaption module receives a plug-in calling message for calling a plug-in by an application, the transferring of the plug-in calling message to the plug-in to be processed by the plug-in includes:

receiving, by the second application connecting module of the adaption module, the plug-in calling message, and sending the plug-in calling message to the plug-in connecting module of the adaption module; and receiving, by the plug-in connecting module, the plug-in calling message, and sending the plug-in calling message to the plug-in to be processed by the plug-in.

When the adaption module receives an application calling message for calling an application by a plug-in, the transferring of the application calling message to the application to be processed by the application includes:

receiving, by the plug-in connecting module of the adaption module, an application calling message for calling an application by a plug-in, and sending the application calling message to the second application connecting module of the adaption module; and receiving, by the second application connecting module, the application calling message, and sending the application calling message to the application for being processed by the application.

As seen from the above technical solutions, by way of counting historical data for preloading webpages in a pre-set time period, the present disclosure automatically updates a preloading policy based on changes of the historical data, so that the preloading policy can adapt to a network and a user access condition in real time, thereby improving the hit accuracy in preloading webpages.

BRIEF DESCRIPTION OF THE DRAWINGS

In order to clearly illustrate the technical solutions in the embodiments of the present disclosure, the accompanying drawings are briefly introduced below. Apparently, persons of ordinary skill in the art can further derive other accompanying drawings based on the accompany drawings as described herein, without making creative labor work.

DETAILED DESCRIPTION

To enable those skilled in the art to understand the technical solutions in the present disclosure in a better way, the technical solutions in the embodiments of the present disclosure are described below with reference to the accompanying drawings. Embodiments described below are merely a part of the various embodiments of the present disclosure. All the other embodiments derived by persons of ordinary skill in the art based on the embodiments of the present disclosure, without making creative labor work, shall fall within the protection scope of the present disclosure.

Figure 1A:
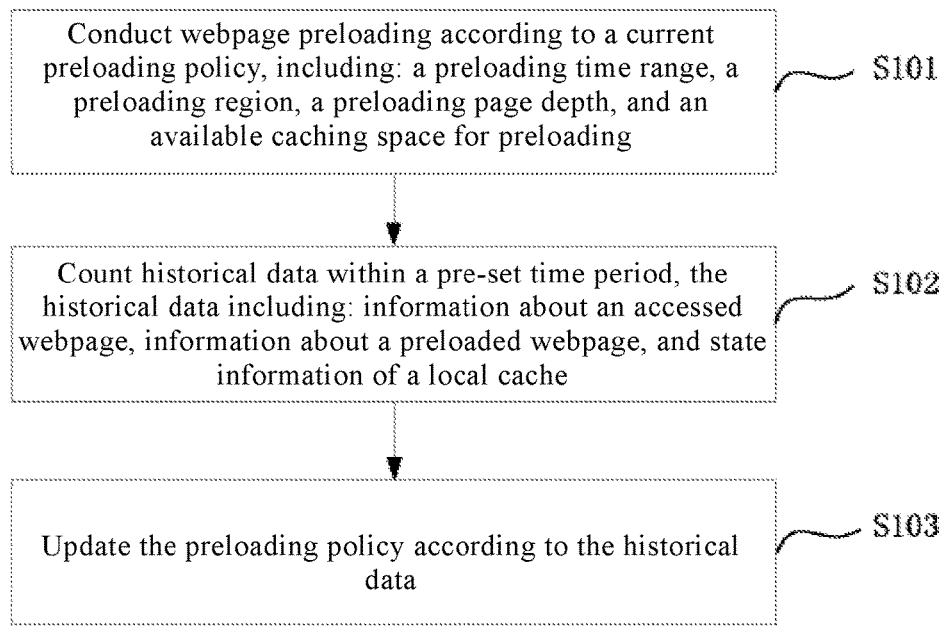
FIG. 1A is a flow chart illustrating a method for webpage preloading, according to an embodiment of the present disclosure.

FIG. 1A is a flow chart illustrating a method for webpage preloading, provided in an embodiment of the present disclosure. The method includes the following steps.

Step S101: conducting webpage preloading according to a current preloading policy. The preloading policy includes: a preloading time range, a preloading region, a preloading page depth, and an available caching space for preloading.

The webpage preloading can be conducted according to a current preloading policy. The current preloading policy may include, for example, a current preloading time ranging from about eight o'clock to about eleven o'clock in the morning, and/or from about seven o'clock to about ten o'clock in the evening, a preloading region is all cities in East China district, North China district, Northeast China district, and South China district, a preloading page depth of 3 with respect to an entry page (supposing that a current page is included), and/or an available caching space of 100 M for preloading.

When a current time is in the preloading time range, a current region belongs to the preloading region, and a local available cache space is higher than 100 MB, a preloading operation may start.

As described herein, the preloading time range, the preloading region, and the preloading page depth may be set universally across the whole network, or a preloading time and a preloading page depth may be set respectively according to a different domain name, a specific webpage type, and a specific region. In the present disclosure, the so-called domain name refers to a domain name in a broad sense, which may be a sub-domain name, or a sub-category webpage under a certain domain name.

For example, the method may first classify the webpages based on a domain name. For example, under a domain name of Baidu, the method may then set three preloading regions of East China, North China, and South China. Each preloading region is set with its corresponding preloading time range and preloading page depth. In other instances, the method may first classify the webpages based on a region. For example, within North China district, the method may classify the webpages based on domain names, e.g., Baidu, Sohu, Sina, etc. Each domain name is configured with its corresponding preloading time range and preloading page depth.

Figure 1B:
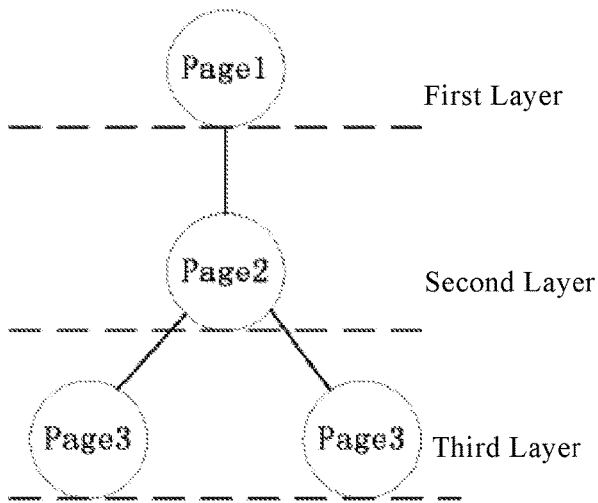
FIG. 1B is a schematic illustration of a preloading page depth, according to an embodiment of the present disclosure.

The concept of a preloading page depth is explained herein. A page depth refers to a number of layers of webpages that may be accessed in depth by a user from one webpage link. For example, FIG. 1B is a schematic illustration of a preloading page depth. First, a current webpage is designated as a reference page, which is also called an entry page, e.g., a home page of Baidu. This page is called Page1. Then, one or more webpage links are selected from the home page of Baidu, such as "Baidu News," which is called Page2. Then, one or more links are selected from "Baidu News," such as "Internet" and "Science and Technologies," which are called Page3. Page1 is the first layer, Page2 is the second layer, and Page3 is the third layer. Both Page2 and Page3 are referred to as preloaded pages. At this time, the preloading page depth is 3, which implies that a distance from a preloaded page from the most bottom layer to the reference page is 3 (considering that the reference page is included). Alternatively, some documents or techniques consider that, a page depth at this time is 2 (considering that the reference page is not included).

A webpage to be preloaded, herein referred to as a preloaded webpage, may be selected according to a keyword method, a whitelist method, and so on, which is not repeatedly described herein.

When conducting preloading, after a preloaded webpage is selected, the current webpage (reference page) is parsed and acquired, and an address identifier of the preloaded webpage such as a URL, is sent to a preloading queue. The URL is acquired from the preloading queue, which may be a first in first out (FIFO) queue, or may be an FIFO queue based on priority. Then, a request for acquiring data of the webpage to be preloaded is sent to a network. Then, after acquiring a positive acknowledgement from the network, the data of the webpage is acquired from a server, and then the data of the webpage is saved in a local cache. When a user accesses the preloaded webpage, the data of the webpage is extracted from the cache and is presented to the user.

As described herein, in embodiments of the present disclosure, among the several parameters included in the preloading policy, that is, a preloading time range, a preloading region, a preloading page depth, and an available caching space for preloading, one or more of the several parameters may be used selectively. In this embodiment, the several parameters are all used in the preloading policy, which is a preferred solution.

Step S102: counting historical data within a pre-set time period. The historical data includes: information about an accessed webpage, information about a preloaded webpage, and state information of a local cache.

The historical data may be counted within a pre-set time period, or may be counted after a certain times of the preloading, for example, historical data is counted once after the preloading is conducted for 50 times.

The information about the accessed webpage includes: an access quantity of the accessed webpage, an accessed time range, and a service deployment region to which a terminal that conducts the webpage accessing belongs.

The information about a preloaded webpage includes: an access quantity of a preloaded webpage.

The state information of a local cache includes: a capacity of a current free space in the local cache and a capacity of a repeatedly useable space in the local cache.

The repeatedly useable space in the local cache is explained herein. In the data of the preloaded pages stored in a cache, one part of the data may not be accessed by the user for quite a long time, or its access quantity is rather low. Thus, this part of data of the pages may be cleared up periodically, and a space taken by this part of data is the so-called repeatedly useable space.

Step S103: updating the preloading policy based on the historical data.

Step S103 may include based on the access quantity of the accessed webpage and the accessed time range, calculating a time range when the access quantity is higher than a first threshold value; and based on the time range when the access quantity is higher than the first threshold value, adjusting the preloading time range.

Step S103 may further include based on the access quantity of the accessed webpage and the service deployment region to which a terminal that conducts webpage accessing belongs, calculating whether an access quantity in a pre-set region is higher than a second threshold value, if yes, setting the region as a preloading region, and if not, excluding the region from the preloading region.

Step S103 may further include based on the access quantity of the accessed webpage and the access quantity of the preloaded webpage, calculating a user usage rate of the preloaded webpage, and based on the user usage rate, adjusting the preloading page depth.

Step S103 may further include calculating a capacity of a current free space in a local cache and a capacity of a repeatedly useable space in the local cache, generating a target space capacity, and based on the target space capacity, adjusting a capacity of the available caching space for preloading.

In an initial state for preloading, a target domain name may be selected from a pre-set domain name list, and then, a webpage may be selected from the target domain name as a preloaded webpage. In addition, some access parameters of domain names may be pre-set, such as a webpage page view (PV) quantity, and/or a domain name user quantity, and/or users' mean access quantity, and/or a length of users' stay time. Based on the access parameters of the domain names, accessing priority of each domain name in the domain name list is decided. Thus, when updating the historical data, the accessing priority of each domain name may be adjusted by way of updating the access parameters of the domain names.

As described herein, the preloading policy may be updated based on a number of parameters contained in the preloading policy. For example, the preloading policy may include one or more of the parameters including a preloading time range, a preloading region, a preloading page depth, and an available caching space for preloading, and one or more of the parameters may be updated selectively. In this embodiment, several parameters are all updated, which is a preferred solution.

In a next preloading period, the preloading is conducted according to the updated preloading policy.

Figure 2A:
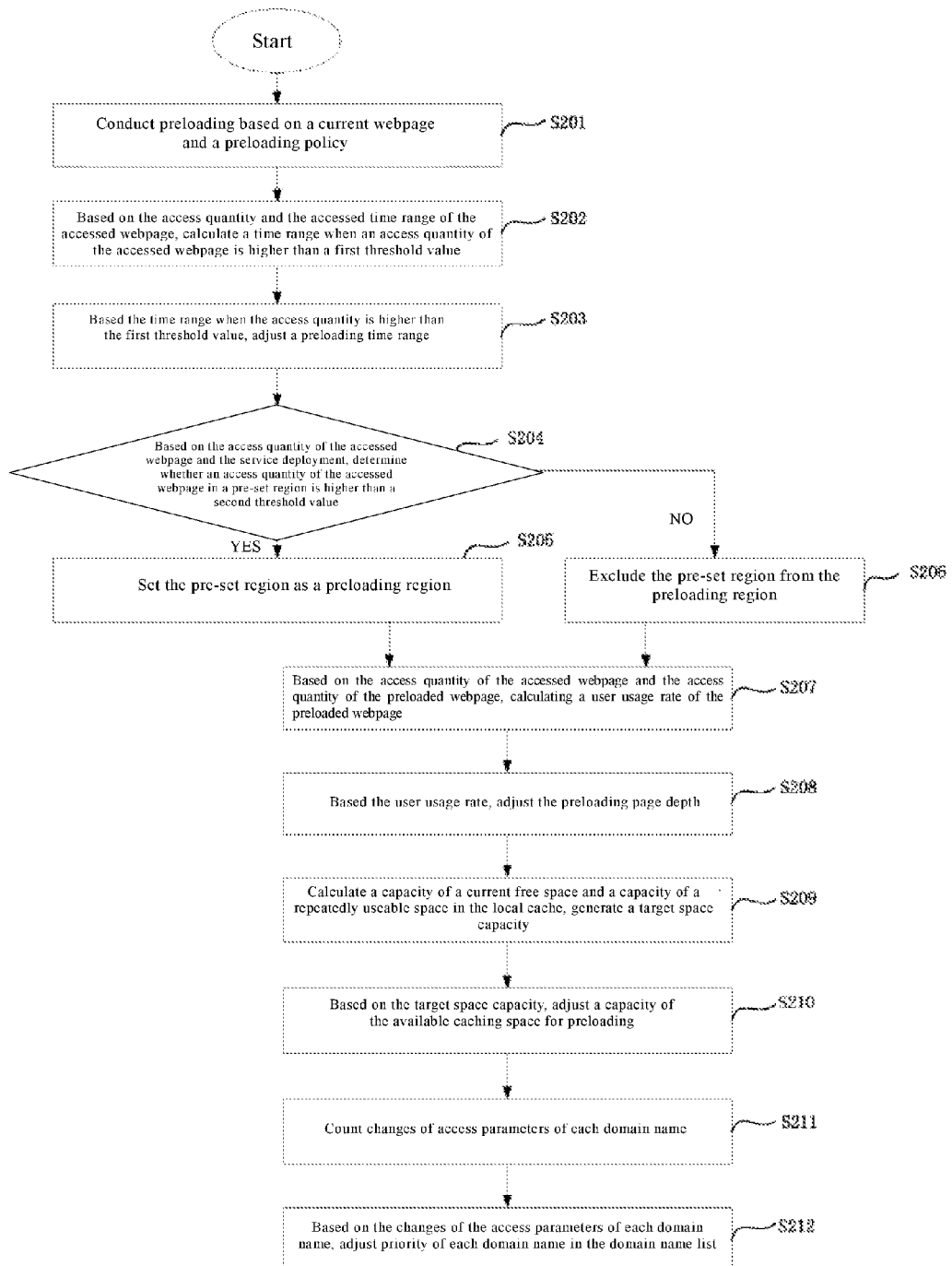
FIG. 2A is a flow chart illustrating a method for webpage preloading, according to an embodiment of the present disclosure.

FIG. 2A is a flow chart illustrating a method for webpage preloading, according to an embodiment of the present disclosure. The method includes the following steps:

Step S201: conducting preloading based on a current webpage and a preloading policy.

Figure 2B:
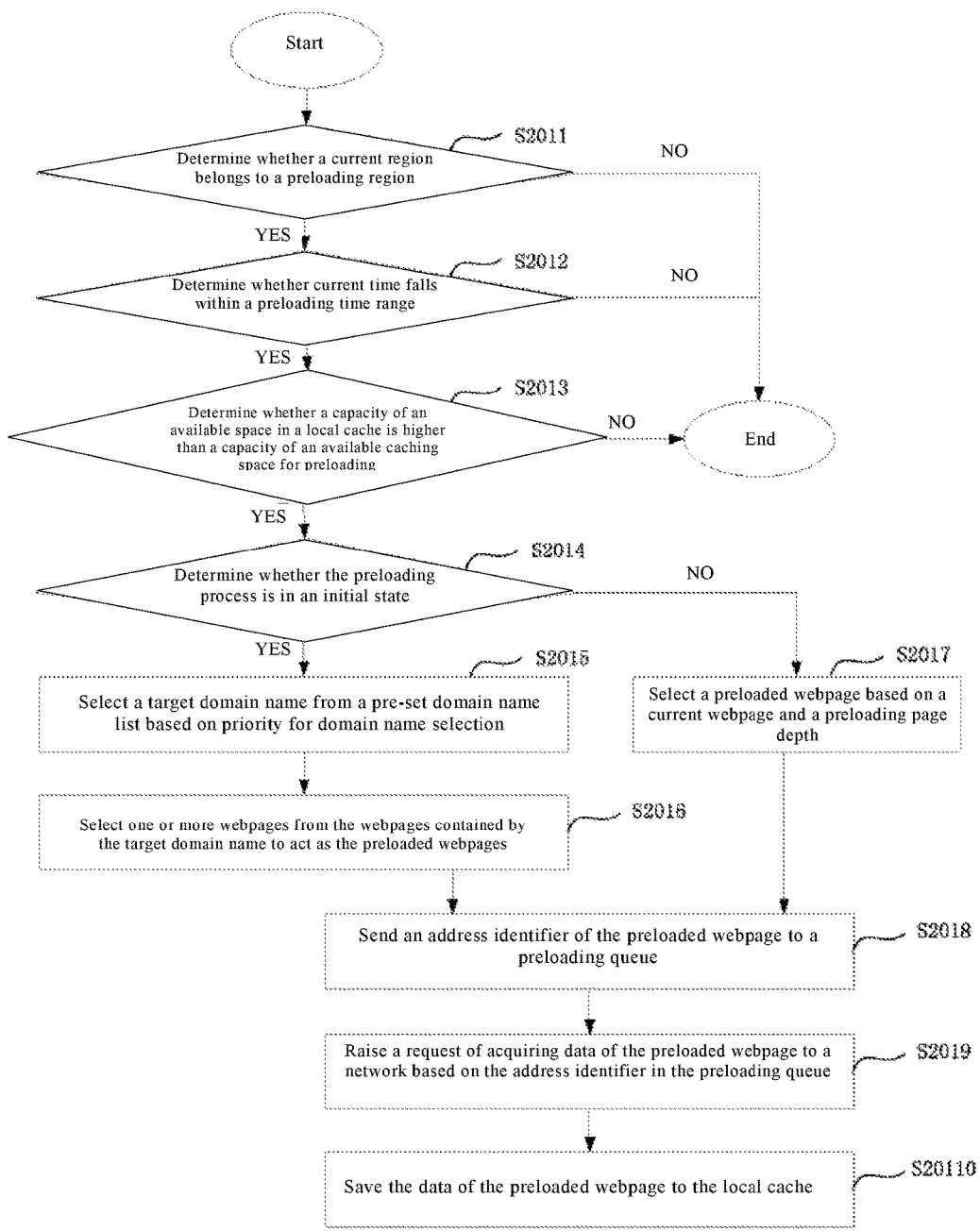
FIG. 2B is a flow chart illustrating a method for the preloading, according to an embodiment of the present disclosure.

The preloading operation in step S201 may include the following steps S2011 to S20110. Referring to FIG. 2B, FIG. 2B is a flow chart illustrating a method for the preloading operation.

Step S2011: determining whether a current region belongs to a preloading region or not. If yes, step S2012 is performed; otherwise, no preloading is conducted, and the flow is ended.

Step S2012: determining whether a current time falls within a preloading time range or not. If yes, step S2013 is performed; otherwise, no preloading is conducted, and the flow is ended.

A preloading time may be set respectively in each of the pre-set preloading regions. The preloading regions may be set by taking several provinces, cities, areas, and so on as a region, or may be divided independently based on network deployment. In a whole day, several preloading time ranges may be set.

Step S2013: determining whether a capacity of an available space in a current cache is higher than a capacity of an available caching space for preloading or not. If yes, step S2014 is performed; otherwise, no preloading is conducted, and the flow is ended.

The capacity of an available space in a current cache includes two parts, in which one part is a capacity of a free space in the current cache, and the other part is a capacity of a repeatedly useable space. The concept of the repeatedly useable space has been explained above, which is not repeatedly described herein.

As described herein, the present disclosure does not restrict a sequence for performing steps S2011, S2012, and S2013, and the steps in this embodiment are only one of the preferred solutions.

In other embodiments of the present disclosure, one or two steps of steps S2011, S2012, and S2013 may be performed selectively, and in this embodiment, the above three steps are all performed, which is only one of the preferred solutions.

S2014: determining whether the webpage preloading process is in an initial state or not. If yes, steps S2015 to S2016 are performed; otherwise, step S2017 is performed.

Generally, a current page may be set as a reference page for being parsed. When the webpage preloading process is in an initial state, it implies that the system is just started, or no current page exists, and thus no preloading can be conducted based on a current page. Instead, preloaded webpages can only be selected from a pre-set domain name list.

Step S2015: selecting a target domain name from a pre-set domain name list based on priority for domain name selection.

Step S2016: selecting one or more webpages from webpages contained by the target domain name as the webpages to preload.

When the system is in an initial state, no current page exists, and several domain names may be selected from a pre-set domain name configuration list, for example, a domain name of "Baidu" may be selected. Several webpages may be selected from webpages contained by the domain name, for example, a home page of Baidu, or a home page of Baidu News, etc., as the preloaded webpages.

The domain name list has several domain names, and the priority of each domain name is decided by a series of access parameters for each domain name. The access parameters include a webpage PV quantity, and/or a domain name user quantity, and/or users' mean access quantity, and/or a length of users' stay time. For example, it may be contemplated that, when selecting a domain name, the webpage PV quantity may be considered with the highest priority; next, the domain name user quantity may be considered with the second highest priority; then, the users' mean access quantity may be considered with the third highest priority; and finally, the length of the users' stay time may be considered with the fourth highest priority. When the webpage PV quantities of two domain names are more or less the same, the corresponding domain name user quantity is determined then. When the domain name user quantities are more or less the same, the users' mean access quantity is considered. Then, the length of the users' stay time is considered at last. The sequence of using these parameters may also be altered, which is not restricted herein. Alternatively, a weight may be set for each parameter, and then by way of multiplying each parameter with their corresponding weight and then summing up their products, a priority sequence may be determined accordingly.

The domain names pre-stored in the domain name configuration list are domain names in a broad sense, which may be sub-domain names, or sub-category webpages under certain domain names.

Step S2017: selecting a preloaded webpage based on a current page and a preloading page depth.

A webpage to be preloaded, herein referred to as a preloaded webpage, may be selected according to a keyword method, a whitelist method, and so on, which is not repeatedly described herein.

Step S2018: sending an address identifier of the preloaded webpage to a preloading queue.

The preloading queue may be an FIFO queue, or may also be an FIFO queue based on priority. The address identifier of a webpage may be a URL of the webpage or another identifier.

Step S2019: raising a request for acquiring a data of the preloaded webpage to a network based on the address identifier in the preloading queue.

After acquiring a positive acknowledgement from the network, the data associated with the preloaded webpage is acquired based on the address identifier of the preloaded webpage.

Step S20110: saving the data of the preloaded webpage to a local cache.

Step S20110 may include waiting for a user to access the preloaded webpage, and when the user accesses the preloaded webpage, extracting the data of the preloaded webpage from the local cache and presenting the data to the user.

Within a pre-set time period, or after the preloading is conducted for a number of pre-set times, steps S202 to S212 below are performed.

Step S202: based on the access quantity of the accessed webpage and the accessed time range, calculating a time range when the access quantity is higher than a first threshold value.

Step S202 may take the preloading region or each large region in a network deployment, or may take a specific type of webpages as an object for counting, and set the first threshold value. Step S202 may respectively count a time range when an access quantity of each webpage within the object is higher than the first threshold value. Alternatively, step S202 may take the whole network as an object.

Step S203: adjusting a preloading time range based on the time range when the access quantity is higher than the first threshold value.

When a larger deviation exists between the counted time range and the existing preloading time range, the preloading time range may be adjusted.

For example, within a certain time period, the peak time of the highest network access quantity may be shifted. For example, by way of counting, it may be found that, under a normal circumstance, from eight o'clock to ten o'clock in the morning of working days, the public may be more likely to access webpages about news, current events, and so on. From seven o'clock to eleven o'clock in the evening, the public may be more likely to access webpages about entertainments, videos, and so on. On weekends, the time during which the public accesses webpages may be less concentrated. Moreover, during sporting events like the Olympics or the World Cup, the public generally browses corresponding news or video webpages according to a time schedule of the sporting events. Better effects may be achieved when preloading is conducted at the peak time of the network access quantity, so the peak time of the network access quantity needs to be counted in real time to adjust the preloading time range for starting the webpage preloading process timely.

Step S204: based on the access quantity of the accessed webpage and the service deployment region to which a terminal that conducts webpage accessing belongs, determining whether an access quantity of a webpage in a pre-set region is higher than a second threshold value or not; if yes, performing Step S205; otherwise, performing Step 206.

Step S205: setting the region as a preloading region.

Step S206: excluding the region from the preloading region.

When the access quantity of the webpage in the region is higher than the second threshold value, if the region is a currently preloading region, the region is still set as a preloading region; if the region is not a currently preloading region, the region is added to the preloading region.

When the access quantity of the webpage in the region is no higher than the second threshold value, if the region is a currently preloading region, the region is excluded as a preloading region.

Step S207: based on the access quantity of the accessed webpage and the access quantity of the preloaded webpage, calculating a user usage rate of the preloaded webpage.

Herein, the concept of a user usage rate is explained. With reference to the concept of page depth described in the above embodiments, it is contemplated that, supposing M pages are preloaded in a webpage at the last layer for preloading, but the user only accesses N webpages among the M webpages. At this time, the user usage rate is N/M.

Step S208: based on the user usage rate, adjusting the preloading page depth.

When N/M is lower than a pre-set third threshold value, the preloading page depth may be reduced. When N/M is higher than a pre-set fourth threshold value, the preloading page depth may be increased.

As described herein, in a webpage below the last layer for webpage preloading, for example, when a page depth is 3, in a layer below the Page3 webpage, that is, in a Page4 webpage, if a part of the webpage is accessed by the user, and the corresponding access quantity is higher than the fourth threshold value, the page depth may be increased.

Step S209: calculating a capacity of a current free space in a local cache and a capacity of a repeatedly useable space in the local cache, and generating a target space capacity accordingly.

Step S210: based on the target space capacity, adjusting a capacity of the available caching space for preloading.

Step S211: counting changes of access parameters of each domain name.

The access parameters of each domain name are access parameters for selecting domain names from a domain name list, which include: a webpage PV quantity, a domain name user quantity, users' mean access quantity, and/or a length of users' stay time.

Step S212: based on changes of the access parameters of each domain name, adjusting the priority of each domain name in the domain name list.

As described herein, steps S202 and S203 constitute one group of steps, steps S204, S205, and S206 constitute one group of steps, steps S207 and S208 constitute one group, steps S209 and S210 constitute one group, and steps S211 and S212 constitute one group of steps, that is, a total of five groups. The present disclosure does not restrict the sequence for performing the above five groups of steps. In other embodiments of the present disclosure, one or more of the five groups of steps may be performed selectively. In this embodiment, the five groups of steps are all performed, which is one of the preferred solutions.

Corresponding to the method for webpage preloading provided by the present disclosure, the present disclosure further provides a device for webpage preloading, according to an embodiment of the present disclosure.

Figure 3:
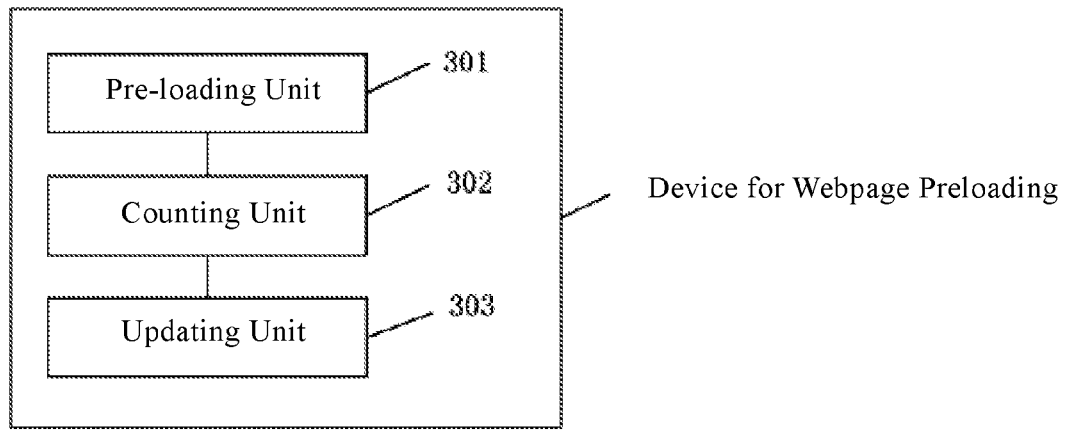
FIG. 3 is a schematic block diagram illustrating a device for webpage preloading, according to an embodiment of the present disclosure.

Referring to FIG. 3, FIG. 3 is a schematic block diagram illustrating a device for webpage preloading, according to an embodiment of the present disclosure.

For ease of making descriptions, the device in this embodiment is described by way of being divided into various units based on their different functions. As described herein, when implementing the present disclosure, the functions of each unit can be implemented by one or more software and/or hardware.

The device in this embodiment includes: a pre-loading unit 301, a counting unit 302, and an updating unit 303.

The pre-loading unit 301 conducts webpage preloading according to a current preloading policy. The preloading policy includes: a preloading time range, a preloading region, a preloading page depth, and an available caching space for preloading.

A preloading time may be set respectively for each of the pre-set preloading regions. The preloading regions may be set by taking several provinces, cities, areas, and so on as a region, or may be divided independently based on network deployment. In a whole day, several preloading time ranges may be set.

As described herein, in other embodiments of the present disclosure, parameters included in the preloading policy used by the pre-loading unit 301 may include, a preloading time range, a preloading region, a preloading page depth, and an available caching space for preloading, and one or more of the parameters may be used selectively. In this embodiment, several parameters are all used in the preloading policy, which is a preferred solution.

The counting unit 302 counts historical data within a pre-set time period. The historical data includes: information about an accessed webpage, information about a preloaded webpage, and state information of a local cache.

The updating unit 303 updates the preloading policy based on the historical data counted by the counting unit 302.

Figure 4:
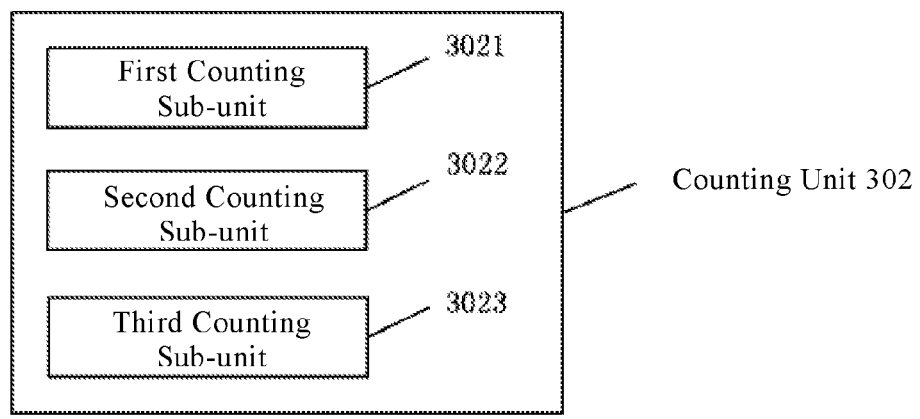
FIG. 4 is a schematic block diagram illustrating a counting unit, according to an embodiment of the present disclosure.

As shown in FIG. 4, the counting unit 302 may include:
a first counting sub-unit 3021 that counts the information about an accessed webpage, which includes: an access quantity of the accessed webpage, an accessed time range, and a service deployment region to which a terminal that conducts webpage accessing belongs;
a second counting sub-unit 3022 that counts the information about a preloaded webpage, which includes an access quantity of a preloaded webpage; and
a third counting sub-unit 3023 that counts state information of a local cache, which includes: a capacity of a current free space in the local cache and a capacity of a repeatedly useable space in the local cache.

Figure 5:
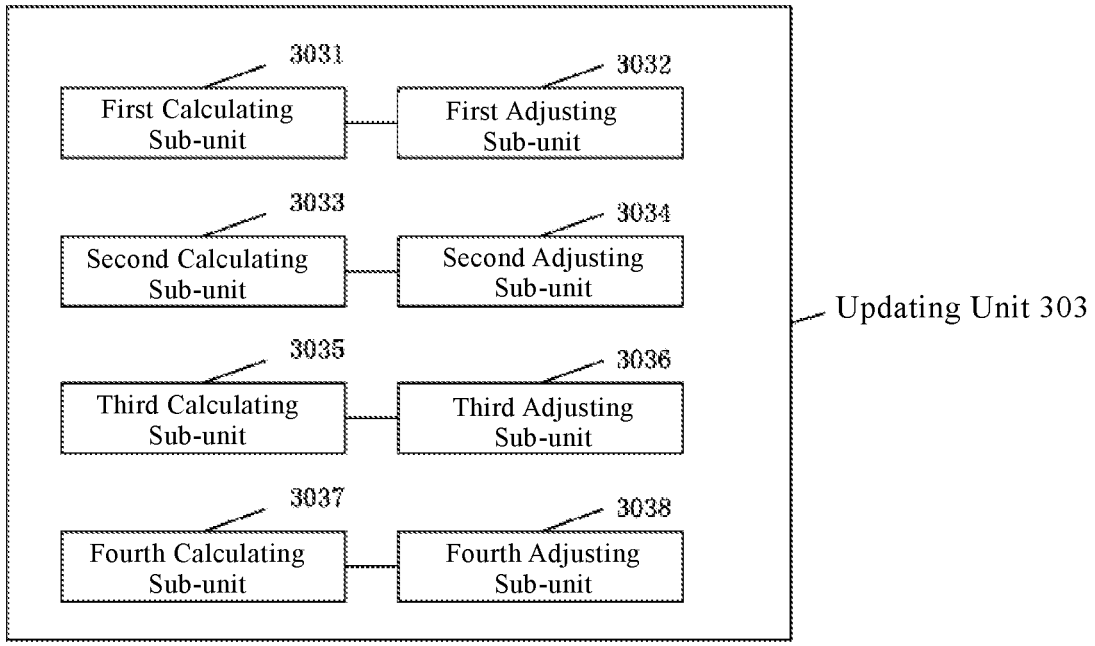
FIG. 5 is a schematic block diagram illustrating an updating unit, according to an embodiment of the present disclosure.

As shown in FIG. 5, the updating unit 303 may include:
a first calculating sub-unit 3031 that calculates a time range when an access quantity is higher than a first threshold value based on the access quantity and the accessed time range of the accessed webpage.

The updating unit 303 may take the preloading region or each large region in a network deployment, or take a specific type of webpages as an object for counting or calculation, and set a first threshold value. The updating unit 303 may respectively count or calculate a time range when an access quantity of each webpage within the object is higher than the first threshold value. Alternatively, the updating unit 303 may count by taking the whole network as an object.

The updating unit 303 may further include a first adjusting sub-unit 3032 that adjusts the preloading time range based on the time range when the access quantity is higher than the first threshold value calculated by the first calculating sub-unit 3031.

When a large deviation exists between the counted or calculated time range and the existing preloading time range, the preloading time range may be adjusted.

The updating unit 303 may further include a second calculating sub-unit 3033 that calculates whether an access quantity in a pre-set region is higher than a second threshold value or not based on the access quantity of the accessed webpage and the service deployment region to which a terminal that conducts the webpage accessing belongs.

The updating unit 303 may further include a second adjusting sub-unit 3034 that sets the pre-set region as a preloading region if the access quantity in the pre-set region is higher than the second threshold value. Otherwise, the second adjusting sub-unit 3034 excludes the pre-set region from the preloading region.

The updating unit 303 may further include a third calculating sub-unit 3035 that calculates a user usage rate of the preloaded webpage based on the access quantity of the accessed webpage and the access quantity of the preloaded webpage.

The updating unit 303 may further include a third adjusting sub-unit 3036 that adjusts the preloading page depth based on the user usage rate calculated by the third calculating sub-unit 3035.

How to adjust the preloading page depth has already been described in the above embodiments, which is not repeatedly described herein.

The updating unit 303 may further include a fourth calculating sub-unit 3037 that calculates a capacity of a current free space in a local cache and a capacity of a repeatedly useable space in the local cache.

The updating unit 303 may further include a fourth adjusting sub-unit 3038 that generates a target space capacity based on the capacity of a current free space and the capacity of a repeatedly useable space calculated by the fourth calculating sub-unit 3037, and adjusts a capacity of the available caching space for preloading based on the target space capacity.

As described herein, sub-units 3031 and 3032 constitute one group, sub-units 3033 and 3034 constitute one group, sub-units 3035 and 3036 constitute one group, and sub-units 3037 and 3038 constitute one group. Other embodiments of the present disclosure may selectively include one or more of the above groups, which is not restricted in the present disclosure.

The pre-loading unit 301 may select, from a pre-set domain name list, a target domain name based on priority for domain name selection when the webpage preloading process is in an initial state, and may select a webpage to be preloaded (i.e., a preloaded webpage) from webpages contained in the target domain name. When the webpage preloading process is not in an initial state, the preloading is conducted according to the preloading method described in the above embodiments, which is not repeatedly described herein.

Figure 6:
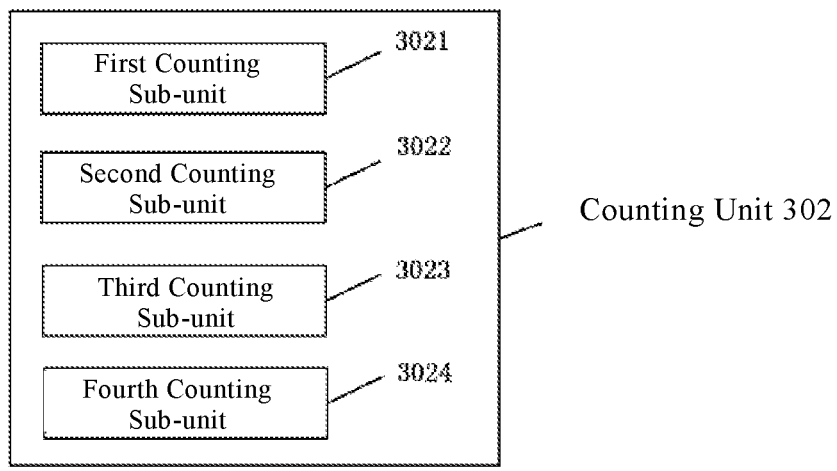
FIG. 6 is schematic block diagram illustrating a counting unit, according to an embodiment of the present disclosure.

As shown in FIG. 6, the counting unit 302 may further include:
- a fourth counting sub-unit 3024 that counts access parameters of each domain name in the domain name list within a pre-set time period. The access parameters include: a webpage page view quantity, and/or a domain name user quantity, and/or users' mean access quantity, and/or a length of users' stay time.

Figure 7:
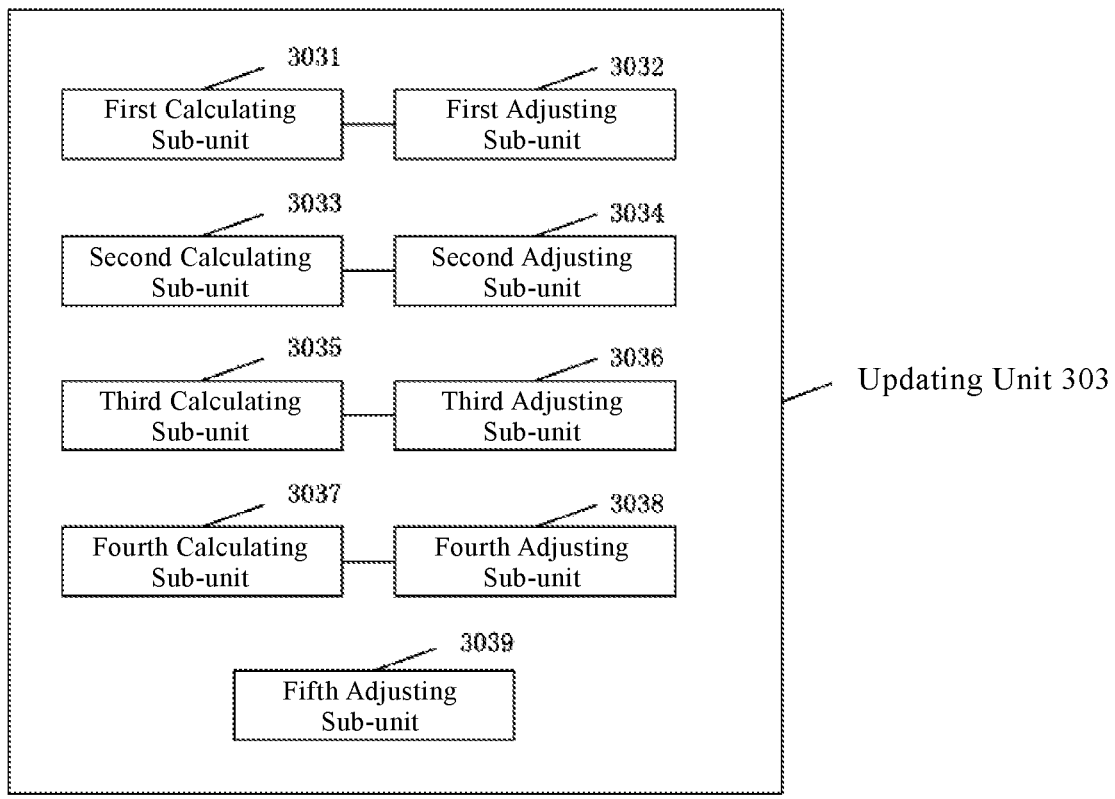
FIG. 7 is schematic block diagram illustrating an updating unit, according to an embodiment of the present disclosure.

As shown in FIG. 7, the updating unit 303 further includes:
- a fifth adjusting sub-unit 3039 that adjusts the priority of the domain name in the domain name list based on changes of the access parameters. How to adjust the priority based on the changes of the access parameters has been described in the above embodiments, which is not repeatedly described herein.

As described in the embodiments of the present disclosure, by way of counting historical data for preloading in a pre-set time period, and automatically updating a preloading policy based on changes of the historical data, the preloading policy can adapt to network and a user access conditions in real time, thereby improving the hit accuracy of webpage preloading.

In addition, the embodiment of the present disclosure further provides a computer-readable storage medium, stored with computer executable instructions, in which when a processor executes the computer-executable instructions, the processor completes the following steps:
acquiring historical data including one or more of types of information, including information about an accessed webpage, information about a preloaded webpage, and state information of a local cache;
counting the historical data within a pre-set time period, and updating a pre-reading policy; and
conducting webpage preloading based on the pre-reading policy.

Figure 8:
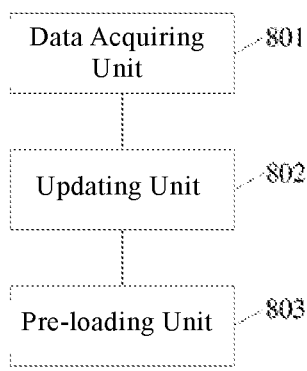
FIG. 8 is a schematic block diagram illustrating a system for webpage preloading, according to an embodiment of the present disclosure.

In addition, referring to FIG. 8, FIG. 8 is a schematic block diagram illustrating a system for webpage preloading, according to an embodiment of the present disclosure. In the system as shown in FIG. 8, the webpage preloading system includes: a storage device and one or more processors.

The system for webpage preloading may further include a data acquiring unit, stored in the storage device, and executed by the one or more processors to acquire historical data including one or more types of information, including information about an accessed webpage, information about a preloaded webpage, and state information of a local cache.

The system for webpage preloading may further include an updating unit, stored in the storage device, and executed by the one or more processors to count the historical data within a pre-set time period and to update a pre-reading policy.

The system for webpage preloading may further include a pre-loading unit, stored in the storage device, and executed by the one or more processors to conduct webpage preloading according to the pre-reading policy.

The historical data includes the information about an accessed webpage. The information about an accessed webpage includes: an access quantity of an accessed webpage and an accessed time range. The pre-reading evaluator includes a first counting sub-unit, that, based on the access quantity of the accessed webpage and the accessed time range, calculates a time range when the access quantity is higher than a first threshold value, and based on the time range when the access quantity is higher than the first threshold value, adjusts a preloading time range.

In some embodiments, the historical data includes the information about an accessed webpage. The information about an accessed webpage includes: an access quantity of an accessed webpage and an access quantity of a preloaded webpage. The pre-reading evaluator further includes a second counting sub-unit that, based on the access quantity of the accessed webpage and/or the access quantity of the preloaded webpage, calculates a user usage rate of the preloaded webpage, and based on the user usage rate, adjusts a preloading page depth.

When the historical data includes a service deployment region to which a terminal that conducts the webpage accessing belongs, the pre-reading evaluator includes a third counting sub-unit that, based on the access quantity of the accessed webpage and the service deployment region to which a terminal that conducts the webpage accessing belongs, calculates whether an access quantity in a pre-set region is higher than a second threshold value or not; if yes, sets the region as a preloading region; and if not, excludes the region from the preloading region.

The historical data includes state information of a local cache, the local cache state information including: a capacity of a current free space in a local cache and/or a capacity of a repeatedly useable space in the local cache. The pre-reading evaluator includes a fourth counting sub-unit that calculates a capacity of a current free space in the local cache and a capacity of a repeatedly useable space in the local cache, generates a target space capacity, and based on the target space capacity, adjusts a capacity of an available caching space for preloading.

In addition, the system for webpage preloading further includes the pre-loading unit, which is stored in the storage device and is executed by the one or more processors. The pre-loading unit selects a domain name from a pre-set domain name list when the webpage preloading process is in an initial state, and loads a webpage corresponding to the domain name as a reference page. The pre-loading unit includes a domain name selection unit that selects a domain name from the domain name list based on a domain name factor. The domain name factor includes one or more of the following factors, including an access quantity of a domain name, a domain name RTT, a domain name user quantity, a length of users' mean stay time, and a users' mean accessed URL quantity. Under a preferred circumstance, the domain name is selected from the domain name list based on a sequence of an access quantity of a domain name, a domain name user quantity, a users' mean accessed URL quantity, a length of users' mean stay time, and a domain name RTT.

In addition, the present disclosure further discloses a computer-readable storage medium stored with computer executable instructions, in which when a processor executes the computer executable instructions, the processor completes the following steps:
acquiring historical data including one or more types of information, including information about an accessed webpage, information about a preloaded webpage, and local cache state information;
counting the historical data within a pre-set time period, and updating a pre-reading policy; and conducting webpage preloading according to the pre-reading policy.

Finally, the embodiments of the present disclosure further disclose a computer-readable storage medium, stored with computer executable instructions, in which when a processor executes the computer executable instructions, the processor completes the following steps:

acquiring historical data including one or more types of information, including information about an accessed webpage, information about a preloaded webpage, and state information of a local cache;

counting the historical data within a pre-set time period, and updating a pre-reading policy; and conducting webpage preloading according to the pre-reading policy.

The updating the pre-reading policy based on the historical data includes one or more of the following circumstances:

when the historical data includes information about an accessed webpage, and the information about the accessed webpage includes an access quantity of an accessed webpage and an accessed time range, the updating the pre-reading policy based on the historical data counted within the pre-set time period includes: based on the access quantity of the accessed webpage and the accessed time range, calculating a time range when the access quantity is higher than a first threshold value; and based on the time range when the access quantity is higher than the first threshold value, adjusting a preloading time range;

when the historical data includes information about an accessed webpage, and the information about the accessed webpage includes an access quantity of an accessed webpage and an access quantity of a preloaded webpage, the updating the pre-reading policy based on the historical data counted within the pre-set time period includes: based on the access quantity of the accessed webpage and/or the access quantity of the preloaded webpage, calculating a user usage rate of the preloaded webpage, and based on the user usage rate, adjusting a preloading page depth;

when the historical data includes a service deployment region to which a terminal that conducts webpage accessing belongs, the updating the pre-reading policy based on the historical data counted within the pre-set time period includes: based on the access quantity of the accessed webpage and the service deployment region to which a terminal that conducts webpage accessing belongs, calculating whether an access quantity in a pre-set region is higher than a second threshold value or not; if yes, setting the region as a preloading region; and if not, excluding the region from the preloading region; and when the historical data includes state information of the local cache, which includes a capacity of a current free space in a local cache and/or a capacity of a repeatedly useable space in the local cache, the updating the pre-reading policy based on the historical data includes: calculating a capacity of a current free space in a local cache and a capacity of a repeatedly useable space in the local cache, generating a target space capacity; and based on the target space capacity, adjusting a capacity of an available caching space for preloading.

Figure 9:
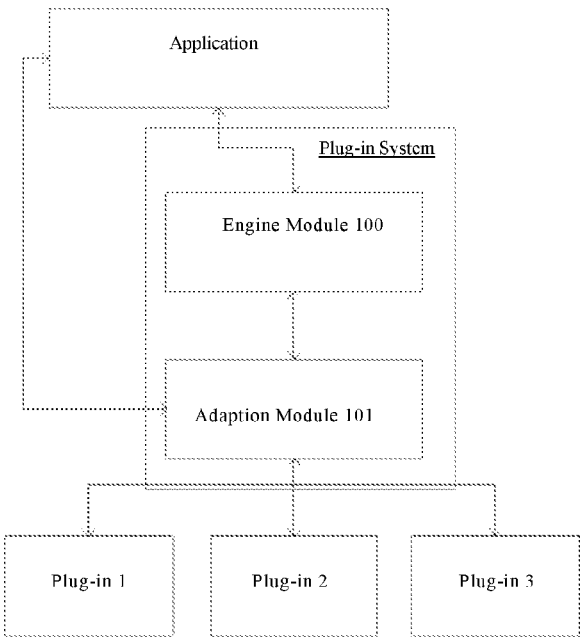
FIG. 9 is an overall schematic block diagram illustrating a plug-in system, according to an embodiment of the present disclosure.

FIG. 9 is a schematic block diagram of a plug-in system according to the present disclosure.

As shown in FIG. 9, the plug-in system of the present disclosure includes an engine module 100 and an adaption module 101.

Figure 10:
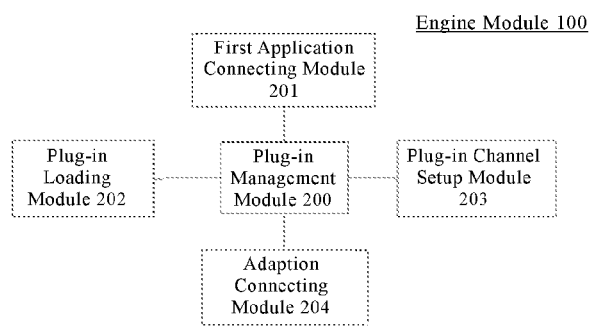
FIG. 10 is a schematic block diagram illustrating an engine module in a plug-in system, according to an embodiment of the present disclosure.
Figure 11:
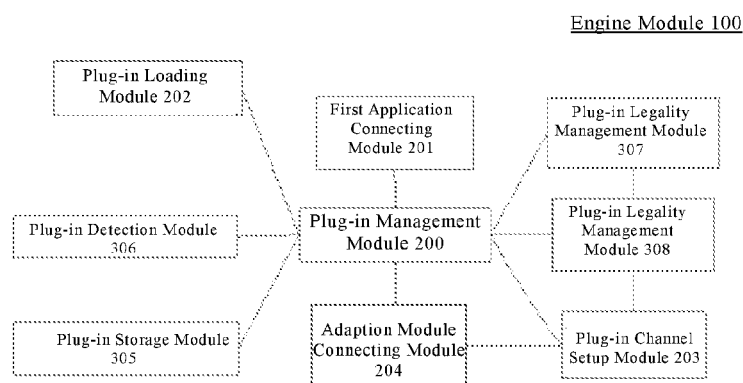
FIG. 11 is a schematic block diagram illustrating an engine module in a plug-in system, according to an embodiment of the present disclosure.

The engine module 100, independent from an application, provides core functions associated with a plug-in, and makes interactions with the adaption module when loading a plug-in. The core functions associated with the plug-in mainly include: plug-in detection, loading, storage, management, as well as other functions. The management function mainly includes plug-in authority management, plug-in version management, plug-in legality determination, and so on. All these functions are completed in different functional modules as shown in FIG. 10 or FIG. 11.

The adaption module 101, provides different functions of an application, in a form of an interface, for being used by a plug-in. When receiving an application calling message for calling an application by the plug-in through the interface, the adaption module 101 transfers the application calling message to the application, for being processed by the application. When receiving a plug-in calling message sent by the application, the adaption module 101 transfers the plug-in calling message to the plug-in through the interface, for being processed by the plug-in.

The adaption module 101 is connected with an application. All application-dependent features and logics associated with the application are implemented in the adaption module 101. The application, the engine module 100, the adaption module 101, and the plug-in deliver data and transfer messages among one another through message interfaces.

In the plug-in system of the present disclosure, a message for calling an application by a plug-in is directly transferred to the application by the adaption module 101 without passing through the engine module 100; and a message for calling a plug-in by an application is directly sent to the adaption module 101, and then, the adaption module 101 transfers the message to the plug-in, without passing through the engine module 100 as well. The engine module is independent from the application and provides core functions associated with the plug-in. Meanwhile, in the present disclosure, logics associated with detailed applications for mobile terminals are integrated in the adaption module 101. Thus, when different applications need to integrate with this plug-in system, only the logics associated with detailed applications in the adaption module 101 need to be rewritten, instead of rewriting the content of the engine module 100. Therefore, the plug-in system has a high flexibility, which greatly reduces the developing difficulty and design difficulty for the developers of the plug-in system, and reduces the working labor. Moreover, since the engine module 100 does not need to be rewritten, the plug-in system presents a higher stability.

FIG. 10 is a schematic block diagram illustrating an embodiment of an engine module 100 in a plug-in system according to the present disclosure.

As shown in FIG. 10, the engine module 100 includes: a plug-in management module 200, a first application connecting module 201, a plug-in loading module 202, a plug-in channel setup module 203, and an adaption connecting module 204.

The plug-in management module 200, after receiving plug-in configuration information and a plug-in mirror generating message, generates a plug-in mirror based on the plug-in configuration information, receives plug-in loading request information transferred from the adaption connecting module 204, sends the plug-in loading request information to the plug-in loading module 202, and receives plug-in loading complete information sent by the plug-in loading module 202.

The plug-in loading module 202 receives plug-in loading request information sent by the plug-in management module 200, and loads a plug-in according to the plug-in loading request information, and sends plug-in loading complete information to the plug-in management module 200. When the adaption module 101 receives a plug-in calling message sent by an application, and queries whether the plug-in is loaded yet, the plug-in loading request information is sent to the adaption connecting module 204, and then is transferred to the plug-in management module 200 by the adaption connecting module 204.

The adaption connecting module 204 transmits interaction information between the engine module 100 and the adaption module 101.

The first application connecting module 201 transmits interaction information between the engine module 100 and an application.

The plug-in channel setup module 203 sets up a plug-in communication channel between a plug-in and an application. For example, a cross-process communication technique may be used to associate a plug-in with an application, and to set up a communication channel between the plug-in and the application.

FIG. 11 is a schematic block diagram illustrating another embodiment of an engine module 100 in a plug-in system according to the present disclosure;

As shown in FIG. 11, besides the plug-in management module 200, the plug-in loading module 202, the adaption connecting module 204, the first application connecting module 201, and the plug-in channel setup module 203 as shown in FIG. 10, the engine module 100 further includes:

- a plug-in storage module 305 that stores a plug-in mirror generated by the plug-in management module 200;
- a plug-in detection module 306 that detects a new plug-in, acquires plug-in configuration information, and sends the plug-in configuration information and a plug-in mirror generating message to the plug-in management module 200;
- a plug-in legality management module 307 that determines legality of a plug-in based on plug-in legality determination information sent by the plug-in management module 200, and sends a legality determination result to the plug-in management module 200; and
- a plug-in authority management module 308 that verifies authority of a plug-in based on plug-in authority management information sent by the plug-in management module 200, and if the plug-in passes the verification, generates a plug-in authority list, and sends the plug-in authority list to the plug-in management module 200.

Figure 12:
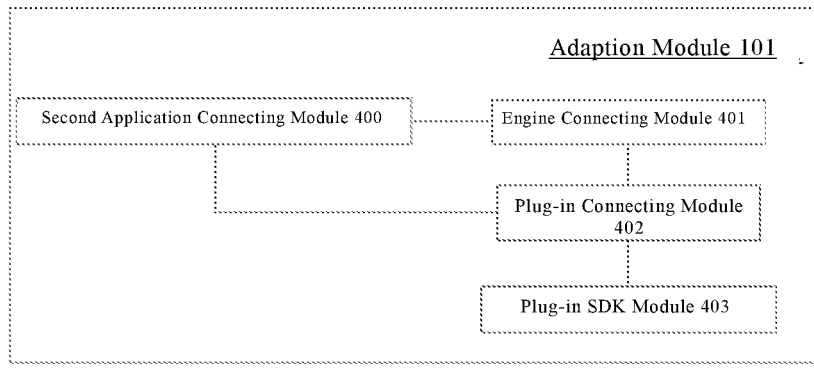
FIG. 12 is a schematic block diagram illustrating an adaption module in a plug-in system, according to an embodiment of the present disclosure.

FIG. 12 is a schematic block diagram illustrating an adaption module 101 in a plug-in system according to the present disclosure.

As shown in FIG. 12, the adaption module 101 includes a second application connecting module 400, an engine connecting module 401, a plug-in connecting module 402, and a plug-in SDK module 403.

The second application connecting module 400, after receiving application calling information for calling an application by a plug-in sent by the plug-in connecting module 402, sends the application calling information to the application; after receiving a plug-in calling message for calling a plug-in by an application, generates a determination request to determine whether the current plug-in is loaded or not, sends the determination request to the engine connecting module 401, and if the plug-in is loaded, sends the plug-in calling message to the plug-in, and if the plug-in is not loaded, waits for the plug-in to be loaded, and after the plug-in is loaded, sends the plug-in calling message to the plug-in.

The engine connecting module 401 transmits interaction information between the engine module 100 and the adaption module 101, and determines whether a current plug-in is loaded or not. The interaction information includes loading information and management information. When the second application connecting module 400 receives a plug-in calling message for calling a plug-in by an application, it sends a message for determining whether a currently called plug-in is loaded or not. After receiving the message, the engine connecting module 401 determines whether the current plug-in is loaded or not, and if the plug-in is not loaded, it sends a plug-in loading request to the adaption connecting module 204 of the engine module 100.

The plug-in connecting module 402 receives a plug-in calling message sent by the second application connecting module 400, and sends the plug-in calling message to the plug-in SDK module 403, and receives an application calling message sent by the plug-in SDK module 403, and sends the application calling message to the second application connecting module 400.

The plug-in SDK module 403, set between the plug-in connecting module 402 and the plug-in, providing an API interface for calling a plug-in, receives an application calling message for calling an application by a plug-in, and sends the application calling message to the second application connecting module 400, receives a plug-in calling message for calling a plug-in by an application sent by the plug-in connecting module 402, and sends the plug-in calling message to the plug-in, for being processed by the plug-in.

The plug-in system of the present disclosure has been described above in detail, and a method for managing a plug-in according to embodiments of the present disclosure is described below with reference to the structure of the plug-in system.

A method of for managing a plug-in in accordance with the present disclosure mainly includes the following steps:

- setting an adaption module and an engine module, independent from an application, in a plug-in system;
- when the adaption module receives a plug-in calling message for calling a plug-in by an application, transferring the plug-in calling message to the plug-in for being processed by the plug-in; and
- when the adaption module receives an application calling message for calling an application by a plug-in, transferring the application calling message to the application for being processed by the application.

Figure 13:
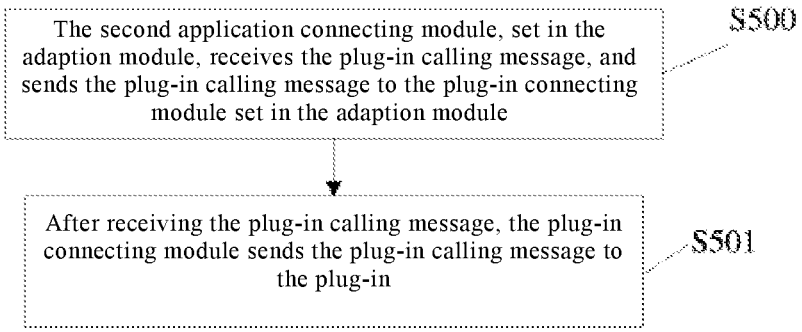
FIG. 13 is a flow chart illustrating an application of a mobile terminal calling a plug-in by using a plug-in system, according to an embodiment of the present disclosure.

FIG. 13 is a flow chart illustrating an application of a mobile terminal calling a plug-in by using a plug-in system in accordance with an embodiment of the present disclosure.

Figure 14:
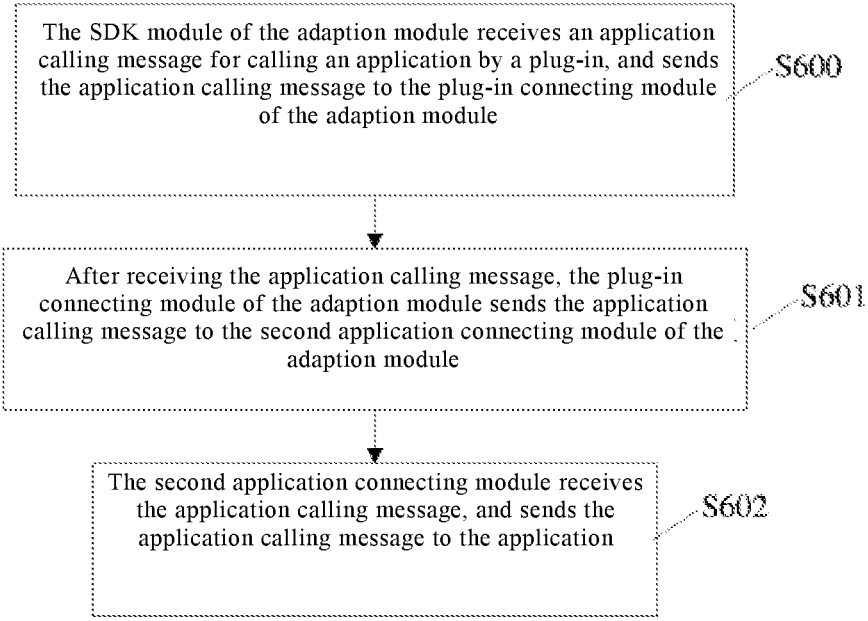
FIG. 14 is a flow chart illustrating a plug-in of a mobile terminal calling an application by using a plug-in system, according to an embodiment of the present disclosure.

FIG. 14 is a flow chart illustrating a plug-in of a mobile terminal calling an application by using a plug-in system in accordance with an embodiment of the present disclosure.

When an application needs to call a plug-in, as shown in FIG. 13, it performs operations including the following steps.

Step S500, at first, the second application connecting module 400 of the adaption module 101 in the plug-in system according to the present disclosure receives a plug-in calling message, and sends the plug-in calling message to the plug-in connecting module 402 of the adaption module 101.

Step S501, after receiving the plug-in calling message, the plug-in connecting module 402 sends the plug-in calling message to the plug-in.

After receiving the plug-in calling message, the plug-in performs corresponding operations in response to the plug-in calling message.

When a plug-in needs to call an application, as shown in FIG. 14, it includes the following steps:

Step S600, first, the plug-in SDK module of the adaption module in the plug-in system according to the present disclosure receives an application calling message for calling an application by a plug-in, and sends the application calling message to the plug-in connecting module 402 of the adaption module 101.

Step S601, after receiving the application calling message, the plug-in connecting module 402 of the adaption module 101 sends the application calling message to the second application connecting module 400 of the adaption module 101.

Step S602, the second application connecting module 400 receives the application calling message, and sends the application calling message to the application.

When receiving the application calling message, the application performs corresponding operations in response to the corresponding application calling message.

As described above, in the method for managing a plug-in according to embodiments of the present disclosure, logics associated with detailed applications are all integrated in the adaption module. The engine module 100 is independent from an application, and provides core functions associated with the plug-in. A message for calling an application by a plug-in is directly transferred to the application by the adaption module 101, without passing through the engine module 100; and a message for calling a plug-in by an application is directly sent to the adaption module 101, and then, the adaption module 101 transfers the message to the plug-in. When different applications need to integrate with this plug-in system, the flexibility for managing the plug-in is enhanced, the developing difficulties and design difficulties for the developers of the plug-in system are greatly reduced, and the working labor is also reduced. Moreover, since the engine module 100 does not need to be changed, the plug-in system presents a higher stability.

Figure 15:
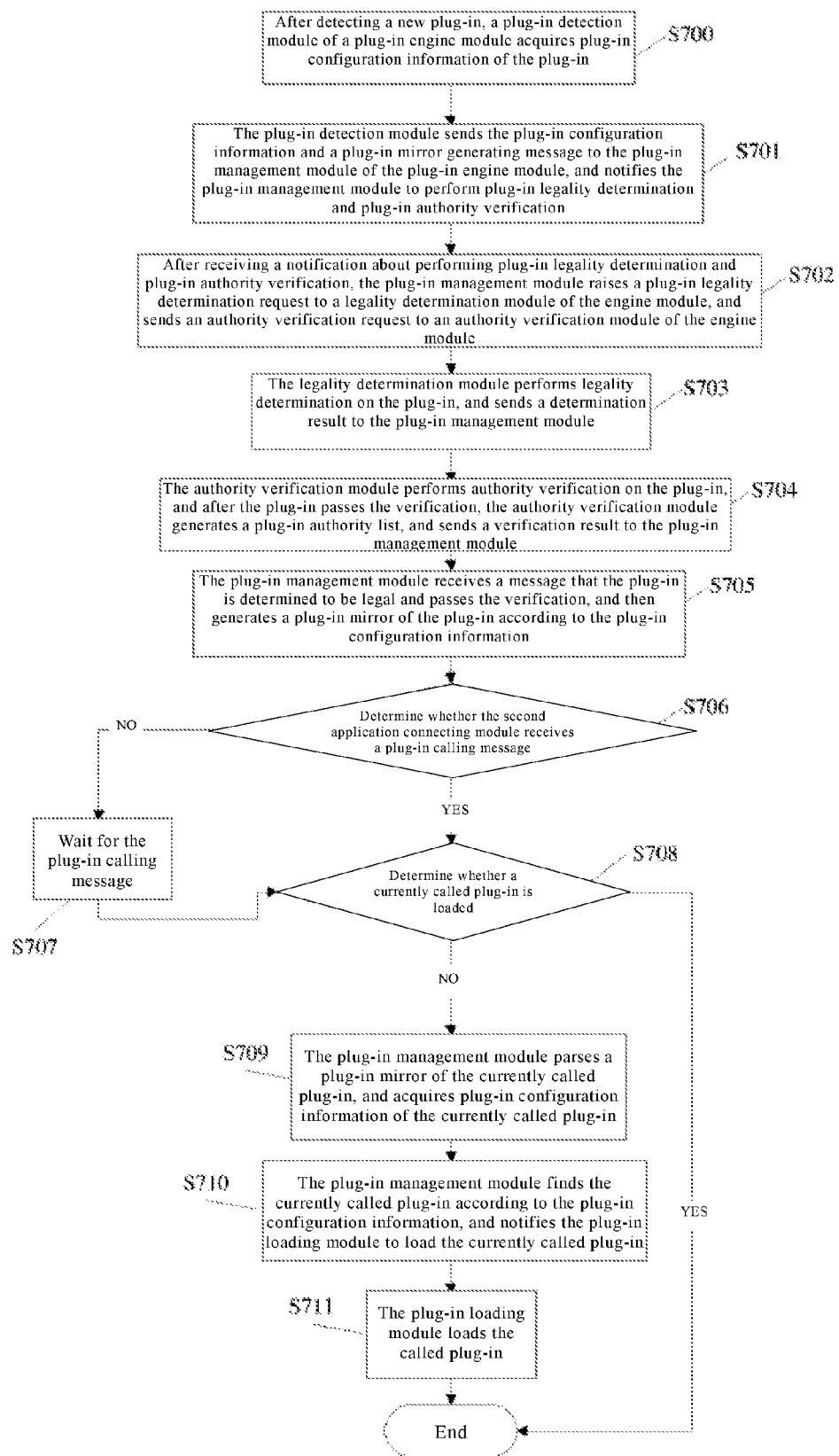
FIG. 15 is a flow chart illustrating mounting a plug-in and loading a plug-in by using a plug-in system, according to an embodiment of the present disclosure.

FIG. 15 is a flow chart illustrating an exemplary method for mounting a plug-in and loading a plug-in using a plug-in system according to an embodiment of the present disclosure.

Firstly, in step S700, after detecting a plug-in, a plug-in detection module 306 of a plug-in engine module 100 acquires plug-in configuration information of the plug-in. For example, the plug-in detection module 306 reads a configuration file of the plug-in, parses the configuration file, and extracts the plug-in configuration information of the plug-in from the configuration file. As described herein, the configuration file of the plug-in at least includes: an ID of the plug-in, an installation address of the plug-in, an icon of the plug-in, description information of the plug-in, a position for presenting the plug-in on an application, and specific events associated with the plug-in.

Then, in step S701, the plug-in detection module 306 sends the plug-in configuration information and a plug-in mirror generating message to the plug-in management module 200 of the plug-in engine module 100, and notifies the plug-in management module 200 to perform plug-in legality determination and plug-in authority verification.

Then, in step S702, after receiving a notification about performing legality determination and authority verification on the plug-in, the plug-in management module 200 raises a plug-in legality determination request to a legality determination module of the engine module 100, and sends an authority verification request to an authority verification module of the engine module 100.

In step S703, the legality determination module performs legality determination on the plug-in, and sends a determination result to the plug-in management module 200.

In step S704, the authority verification module performs authority verification on the plug-in, and after the plug-in passes the verification, the authority verification module generates a plug-in authority list, and sends a verification result to the plug-in management module 200. If the plug-in fails to pass the verification, the verification result contains information indicating that the plug-in fails to pass the verification. If the plug-in passes the verification, the verification result contains information indicating that the plug-in successfully passes the verification and contains a plug-in authority list.

As described herein, steps S703 and S704 may be performed in an sequence, and may be performed separately.

Then, in step S705, when receiving a message that the plug-in is determined to be legal and passes the authority verification, the plug-in management module 200 generates a plug-in mirror of the plug-in according to the plug-in configuration information; when receiving a message that the plug-in is determined to be illegal or fails to pass the verification, the plug-in management module 200 does not generate any plug-in mirror of the plug-in, and the flow is ended. The plug-in mirror, being taken as a copy of the true plug-in, is managed by the plug-in management module 200, and the plug-in management module 200 calls the plug-in storage module 305 for storing the plug-in mirror. The plug-in mirror is an entity for storing the plug-in information, which is used for storing substantially all information of the plug-in.

As shown in FIG. 15, steps S700 to S705 implement a process for installing a plug-in. After the plug-in has been installed, when an application needs to call the plug-in, the flow of the process goes on to step S706. When the plug-in has been installed, based on position information stated in the configuration file of the plug-in, the application displays an icon and a name of the plug-in at the corresponding position on an interface.

Step S706 determines whether the second application connecting module 400 of the adaption module 101 receives a plug-in calling message or not. If the plug-in calling message is received, the second application connecting module 400 of the adaption module 101 sends a request of determining whether a current plug-in is loaded or not to the engine connecting module 401 of the adaption module 101, and then the process goes on to step S708. If the second application connecting module 400 of the adaption module 101 does not receive a plug-in calling message, it enters step S707, and waits for a plug-in calling message.

In step S708, after receiving the request of determining whether a current plug-in is loaded or not, the engine connecting module 401 determines whether the currently called plug-in is loaded or not. If the plug-in is not loaded, the process goes on to step S709. In this step, if the determination result is that the plug-in is loaded, this loading process is ended, and the second application connecting module 400 is informed that the current plug-in is loaded, and then a plug-in calling process starts.

In step S709, the plug-in management module 200 parses a plug-in mirror of the currently called plug-in, and acquires plug-in configuration information of the currently called plug-in.

Then, in step S710, the plug-in management module 200 finds the currently called plug-in based on the plug-in configuration information, and notifies the plug-in loading module to load the currently called plug-in.

In step S711, after receiving a notification about loading a plug-in sent by the plug-in management module 200 in Step S710, the plug-in loading module 202 loads the called plug-in. In the present disclosure, loading the plug-in means running the plug-in.

After it completes to load the plug-in, the application can call the plug-in.

In the flow process shown in FIG. 15, steps S702 to S704 implement legality determination and authority verification of the plug-in, which ensures the legality and security of the plug-in, and enhances the security performance of the plug-in system.

As described herein, in the case that the legality and security of the plug-in are not considered, the process of installing the plug-in according to the present disclosure does not need to perform steps S702 to S704.

The loading of the plug-in implemented through the above flow process can improve the security of the plug-in.

When a plug-in is identified, the method of the present disclosure first installs the plug-in, for example, by way of reading a configuration file of the plug-in, parsing the configuration file, and extracting relevant necessary information of the plug-in from the configuration file, i.e., plug-in configuration information. Then, the method generates a plug-in mirror of the plug-in by the plug-in management module, and saves the plug-in configuration information in the plug-in mirror, which is taken as the plug-in for being managed and displayed. When an application calls the plug-in for the first time, the plug-in management module first finds the plug-in mirror of the plug-in, and based on the plug-in configuration information saved in the plug-in mirror, finds the plug-in corresponding to the plug-in mirror, and then loads the plug-in, e.g., runs the plug-in, and then performs an operation of calling the plug-in, thereby avoiding the problem that each time when an application starts, all the corresponding plug-ins are started at the same time. If one plug-in has never been called, the plug-in will not be loaded. Therefore, the method of the present disclosure uses the plug-in configuration file of the plug-in to delay the process of loading the plug-in, and the method loads and runs the plug-in only when the plug-in is truly called, which avoids the wastes of system resources.

Embodiments in the present disclosure are described in a progressive way. The same or similar parts among the embodiments can be obtained with reference to each other. The device embodiments and the system embodiments described above are only illustrative, the units described as separated parts may be or may not be physically separated, and the parts displayed as units may be or may not be physical units, that is, the parts may be located at one place, or may be scattered at different network units. A part of or all of the modules may be selected based on actual requirements to implement the objects of the solutions in the embodiments. Persons of ordinary skill in the art can understand and implement embodiments derived from the present disclosure without making creative labor work.

Through the above descriptions about the embodiments, persons skilled in the art can clearly understand that, the present disclosure can be implemented by using software in combination with a general hardware platform, or can also be implemented by using hardware. However, in most cases, the former implementation mode is preferred. Based on such understanding, the technical solutions of the present disclosure or the parts that make contributions to current technologies are presented in a form of a software product in essence. The computer software product is stored in a storage medium, which contains instructions for instructing a computing device (e.g., a personal computer, a server, or a network equipment, and so on) to implement all the steps or a part of the steps in the methods of the embodiments of the present disclosure. The storage medium includes: a read only memory (ROM), a random access memory (RAM), a magnetic disk, or an optical disk, as well as various media that can store program codes.

The embodiments described above are only exemplary implementation modes of the present disclosure, which enable persons skilled in the art to understand or implement the present disclosure. Various modifications on the embodiments are apparent for persons skilled in the art. The general principles defined herein can be implemented in other embodiments, as long as they are not departed from the spirits or scopes of the present disclosure. Therefore, the present disclosure is not restricted by the embodiments described herein, but conforms to the widest scope that is consistent with the principles and novel features disclosed herein.

What is claimed is:

1. A method for webpage preloading, the method comprising:
   conducting webpage preloading according to a current preloading policy, the preloading policy comprising: a preloading time range, a preloading region, a preloading page depth, and an available caching space for preloading;
   counting historical data within a pre-set time period, the historical data comprising: information about an accessed webpage, information about a preloaded webpage, and state information of a local cache; and
   updating the preloading policy based on the historical data.

2. The method according to claim 1, wherein
   the information about an accessed webpage comprises: an access quantity of the accessed webpage, an accessed time range, and a service deployment region to which a terminal that conducts webpage accessing belongs;
   the information about the preloaded webpage comprises: an access quantity of the preloaded webpage; and
   the state information of the local cache comprises: a capacity of a current free space in the local cache and a capacity of a repeatedly useable space in the local cache.

3. The method according to claim 2, wherein the updating the preloading policy based on the historical data comprises:
   based on the access quantity and the accessed time range of the accessed webpage, calculating a time range when an access quantity of the accessed webpage is higher than a first threshold value; and based on the time range, adjusting the preloading time range;
   based on the access quantity of the accessed webpage and the service deployment region, calculating whether an access quantity of the accessed webpage in a pre-set region is higher than a second threshold value; if yes, setting the pre-set region as the preloading region; if not, excluding the pre-set region from the preloading region;

based on the access quantity of the accessed webpage and the access quantity of the preloaded webpage, calculating a user usage rate of the preloaded webpage, and based on the user usage rate, adjusting the preloading page depth; and calculating the capacity of a current free space and the capacity of the repeatedly useable space in the local cache, generating a target space capacity; and based on the target space capacity, adjusting a capacity of the available caching space for preloading.

4. The method according to claim 3, further comprising:
when the webpage preloading process is in an initial state, selecting a target domain name from a pre-set domain name list based on priority for domain name selection, and selecting the preloaded webpage from webpages contained in the target domain name.

5. The method according to claim 4, further comprising:
counting access parameters of each domain name in the domain name list within the pre-set time period, the access parameters comprising: a webpage page view (PV) quantity, a domain name user quantity, a users' mean access quantity, and/or a length of users' stay time; and
adjusting priority of the domain name in the domain name list based on the access parameters.

6. A device for webpage preloading, the device comprising a storage device and one or more processors, the device further comprising:
a pre-loading unit stored in the storage device and executed by the one or more processors to conduct webpage preloading according to a current preloading policy, the preloading policy comprising: a preloading time range, a preloading region, a preloading page depth, and an available caching space for preloading;
a counting unit stored in the storage device and executed by the one or more processors to count historical data within a pre-set time period, the historical data comprising: information about an accessed webpage, information about a preloaded webpage, and state information of a local cache; and
an updating unit stored in the storage device and executed by the one or more processors to update the preloading policy based on the historical data counted by the counting unit.

7. The device according to claim 6, wherein the counting unit comprises:
a first counting sub-unit that counts the information about the accessed webpage, comprising: an access quantity of the accessed webpage, an accessed time range, and a service deployment region to which a terminal that conducts webpage accessing belongs;
a second counting sub-unit that counts the information about the preloaded webpage, comprising: an access quantity of the preloaded webpage; and
a third counting sub-unit that counts the state information of the local cache, comprising: a capacity of a current free space in the local cache and a capacity of a repeatedly useable space in the local cache.

8. The device according to claim 7, wherein the updating unit comprises:
a first calculating sub-unit that calculates a time range when an access quantity of the accessed webpage is higher than a first threshold value based on the access quantity and the accessed time range of the accessed webpage;
a first adjusting sub-unit that adjusts the preloading time range based on the calculated time range;

a second calculating sub-unit that calculates whether an access quantity of the accessed webpage in a pre-set region is higher than a second threshold value based on the access quantity of the accessed webpage and the service deployment region;
a second adjusting sub-unit that sets the pre-set region as the preloading region if the access quantity in the pre-set region is higher than the second threshold value; and otherwise, excludes the pre-set region from the preloading region;
a third calculating sub-unit that calculates a user usage rate of the preloaded webpage based on the access quantity of the accessed webpage and the access quantity of the preloaded webpage;
a third adjusting sub-unit that adjusts the preloading page depth based on the user usage rate;
a fourth calculating sub-unit that calculates the capacity of a current free space and the capacity of the repeatedly useable space in the local cache; and
a fourth adjusting sub-unit that generates a target space capacity based on the capacity of the current free space and the capacity of the repeatedly useable space, and adjusts the capacity of the available caching space for preloading based on the target space capacity.

9. The device according to claim 8, wherein:
when the webpage preloading process is in an initial state, the pre-loading unit selects a target domain name from a pre-set domain name list based on priority, and selects the preloaded webpage from webpages contained in the target domain name.

10. The device according to claim 9, wherein
the counting unit further comprises: a fourth counting sub-unit that counts access parameters of each domain name in the domain name list within the pre-set time period, the access parameters comprising: a webpage page view (PV) quantity, a domain name user quantity, a users' mean access quantity, and/or a length of users' stay time; and
the updating unit further comprises: a fifth adjusting sub-unit that adjusts priority of the domain name in the domain name list based on changes of the access parameters.

11. A computer-readable storage medium, stored with computer-executable instructions, wherein when a processor executes the computer-executable instructions, the processor performs the following steps:
conducting webpage preloading according to a current preloading policy, the preloading policy comprising: a preloading time range, a preloading region, a preloading page depth, and an available caching space for preloading;
counting historical data within a pre-set time period, the historical data comprising: information about an accessed webpage, information about a preloaded webpage, and state information of a local cache; and
updating the preloading policy based on the historical data.

12. A method for webpage preloading, the method comprising the following steps:
acquiring historical data containing one or more types of information, comprising information about an accessed webpage, information about a preloaded webpage, and state information of a local cache;
counting the historical data within a pre-set time period and updating a pre-reading policy based on the historical data; and conducting webpage preloading according to the pre-reading policy.

13. The method according to claim 12, further comprising:
parsing URLs in a reference page, selecting URLs of one or more webpages according to the pre-reading policy, and sending the selected URLs to a URL queue; and
preloading webpage data corresponding to the selected URLs in the URL queue.

14. The method according to claim 12, wherein the information about the accessed webpage comprises: an access quantity of the accessed webpage and an accessed time range.

15. The method according to claim 14, wherein the updating of the pre-reading policy based on the historical data counted within the pre-set time period comprises:
based on the access quantity and the accessed time range of the accessed webpage, calculating a time range when an access quantity of the accessed webpage is higher than a first threshold value; and
based on the time range, adjusting a preloading time range.

16. The method according to claim 12, wherein the information about the accessed webpage comprises: an access quantity of the accessed webpage and an access quantity of the preloaded webpage.

17. The method according to claim 16, wherein the updating of the pre-reading policy based on the historical data counted within the pre-set time period comprises:
based on the access quantity of the accessed webpage and/or the access quantity of the preloaded webpage, calculating a user usage rate of the preloaded webpage, and
based on the user usage rate, adjusting a preloading page depth.

18. The method according to claim 12, wherein the historical data comprises: a service deployment region to which a terminal that conducts webpage accessing belongs.

19. The method according to claim 18, wherein the updating of the pre-reading policy based on the historical data counted within a pre-set time period comprises:
based on the access quantity of the accessed webpage and the service deployment region, calculating whether the access quantity of the accessed webpage in a pre-set region is higher than a second threshold value;
if yes, setting the pre-set region as a preloading region; and
if not, excluding the pre-set region from the preloading region.

20. The method according to claim 12, the state information of the local cache comprises: a capacity of a current free space and/or a capacity of a repeatedly useable space in the local cache.

21. The method according to claim 20, wherein the updating of the pre-reading policy based on the historical data counted within the pre-set time period comprises:
calculating the capacity of the current free space and the capacity of the repeatedly useable space in the local cache,
generating a target space capacity; and
based on the target space capacity, adjusting a capacity of an available caching space for preloading.

22. The method according to claim 12, wherein the method further comprises: in an initial state, selecting a domain name from a pre-set domain name list, and loading a webpage corresponding to the domain name to act as a reference webpage.

23. The method according to claim 22, wherein the domain name is selected from the domain name list based on domain name factors, comprising: one or more of an access quantity of a domain name, a domain name RTT, a domain name user quantity, a length of users' mean stay time, and a users' mean accessed URL quantity.

* * * * *